June 11, 1968

P. L. TEMPLE 3,387,566

FLUID OPERATED PRIME MOVER

Filed Dec. 12, 1966

INVENTOR
PETER L. TEMPLE

BY
Cushman, Darby & Cushman
ATTORNEYS

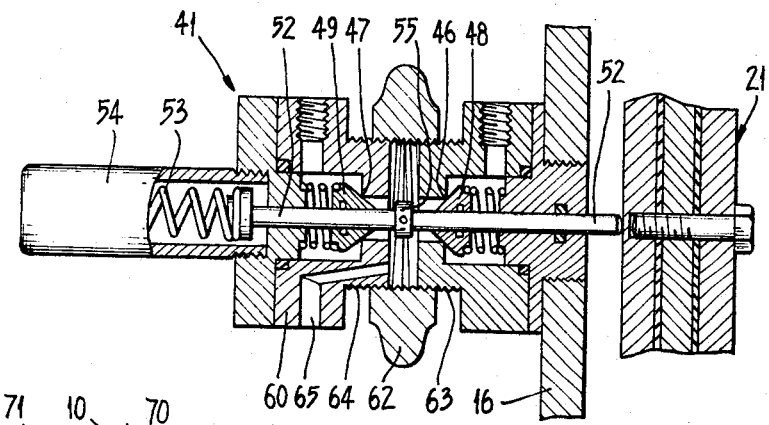
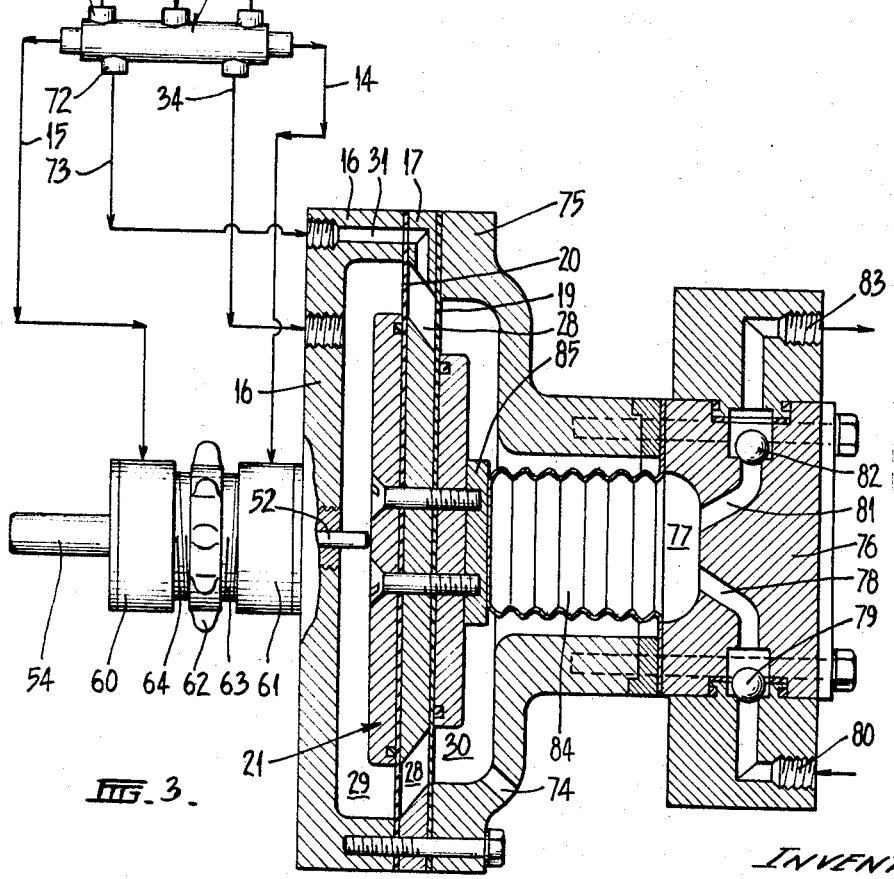

United States Patent Office 3,387,566
Patented June 11, 1968

3,387,566
FLUID OPERATED PRIME MOVER
Peter L. Temple, Ascot Vale, Victoria, Australia, assignor to Imperial Chemical Industries of Australia and New Zealand Limited, Melbourne, Victoria, Australia, a company of Australia
Filed Dec. 12, 1966, Ser. No. 600,916
Claims priority, application Australia, Jan. 10, 1966, 248/66
4 Claims. (Cl. 103—152)

It is the purpose of this invention to provide a simple, non-electric, reciprocating prime mover which may be completely controlled at a remote location, and which may be readily adapted to function as a pump capable of delivering corrosive and other fluids at controllable pressure over extended periods with minimum maintenance.

In order to achieve this object the present invention provides a fluid operated reciprocating prime mover comprising a casing; a diaphragm assembly comprising a first diaphragm sealed across the casing and, spaced therefrom, a second diaphragm of greater area also sealed across the casing, said first and second diaphragm being connected to flex in unison; a first inlet for working fluid formed in the casing to the side of the diaphragm assembly remote from the first diaphragm; a second inlet for working fluid formed in the casing between said first and second diaphragms; and means responsive to flexing of the diaphragms to control the passage of working fluid to and from said casing.

Admission of working fluid through the first inlet causes the diaphragm assembly to be driven in the direction from the second diaphragm to the first diaphragm with a force that is the product of the area of the second diaphragm and the pressure of the working fluid. This constitutes the stroke of the prime mover.

The working fluid between the diaphragms exerts pressure urging the diaphragms in opposite directions, but, as the second diaphragm is larger in area than the first diaphragm, there is a resultant force urging the diaphragm assembly in the direction from the first to the second diaphragm.

That is to say, the diaphragm assembly is biased in the direction of the return stroke. This bias detracts from the force of the power stroke, but this is not usually a serious disadvantage. If it is desired to remove the bias during the power stroke this may be achieved by arranging the control means to vent the second inlet for working fluid during movement of the diaphragm assembly in the direction from the second to the first diaphragm.

The means to control the passage of working fluid may be adjustable to vary the amount by which the diaphragm assembly flexes between successive strokes.

The prime mover may be used as a pump by forming an inlet and an outlet for fluid to be pumped in the casing to the side of the diaphragm assembly remote from the second diaphragm, and providing non-return valves in said inlet and outlet.

The practical advantage of the present invention are most clearly evident when it is used as a pump to convey corrosive liquids, compressed air being used as the working fluid. The only parts of the pump which contact the liquid are the diaphragm, non-return valves and casing, which are available commercially constructed from corrosion resistant materials.

There is an absence of glands and parts moving in relation to each other in contact with the corrosive fluid. The compressed air is applied over the whole area of the larger (second) diaphragm, so that the liquid is delivered at a steady pressure approximately equal to the pressure of the compressed air supply. If a piston type air motor were to be used, such a delivery pressure could only be achieved if the piston and cyinder of the motor were as large in cross-section as the area of the diaphragm. For practical sized pumps, this would entail an expensive piston and cylinder, and complicated connecting parts. The pressure at which liquid is delivered may be controlled by controlling the pressure at which the compressed air is supplied.

Practical arrangements of apparatus according to the present invention will now be described with reference to the accompanying drawings. In these drawings:

FIG. 2 is a partly diagrammatic cross-section of a modification of portion of the pump of FIG. 1, to permit it's use as a metering pump, and FIG. 3 is a partly diagrammatic cross-section of a pump for liquids utilising a prime mover according to the invention.

Figure 1:
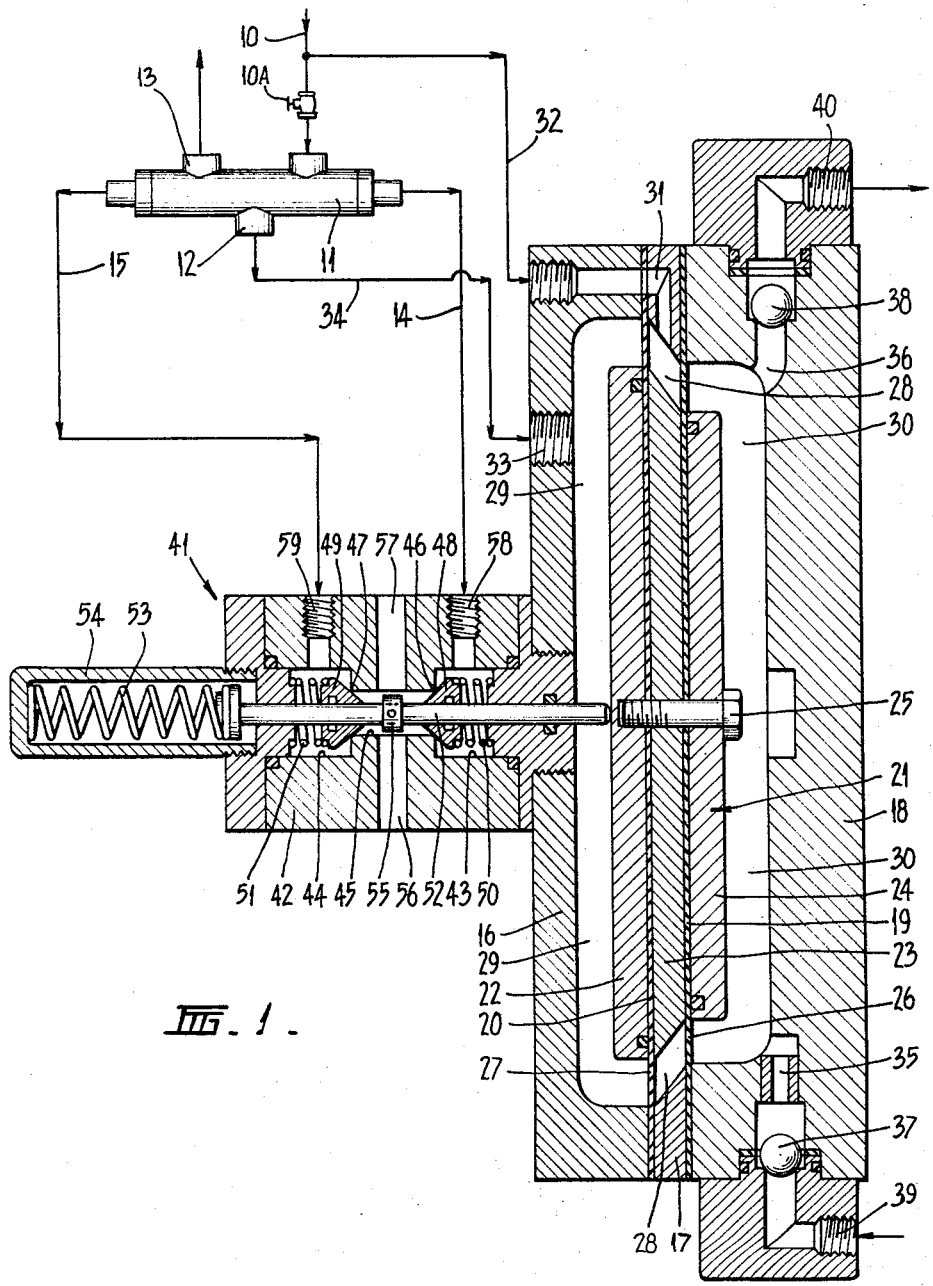
FIG. 1 is a diagrammatic cross section of a pump for liquids.

Referring now to FIG. 1 of the drawing, compressed air is supplied from a mains through the pipe 10, via a pressure regulator 10a to the control means 11, which is a commercially available device incorporating a shuttle valve movable longitudinally within a body from a left hand limit at which the pipe 10 is placed in communication with an outlet 12 to a right hand limit at which the outlet 12 is connected to the exhaust vent 13, the pipe 10 being sealed. Bleeds formed in the shuttle supply compressed air at a low rate of flow through the shuttle to the pipes 14 and 15, leading one from each end of the body.

The casing which is generally cylindrical in shape, consists of three main portions, 16, 17 and 18 bolted together in a conventional manner, the portion 17 constituting a spacer ring to maintain parallel diaphragms 19 and 20 stretched across the casing and sealed thereto at the edges of the diaphragms. The diaphragms 19 and 20 are embodied in a diaphragm assembly indicated generally at 21 and comprising a cylindrical backing plate 22, a frusto-conical spacing plate 23 and a cylindrical front plate 24, held firmly together by a bolt 25. The only portions of the diaphragms 19 and 20 free to flex are the annular edge portions 26 and 27 respectively, which, with the spacer ring 17 and spacing plate 23, enclose a sealed space 28.

The annular diaphragm portion 27, backing plate 22 and casing portion 16 enclose a sealed space 29. The annular diaphragm portion 26, front plate 24 and casing portion 18 enclose a sealed space 30.

A port 31 formed in the casing wall places the space 28 in communication through pipe 32 with pipe 10, so that the space 28 is continually maintained filled with compressed air at mains pressure. A port 33 formed in the wall of the casing connects the space 29 through a pipe 34 with the outlet 12 of the control means 11. Ports 35 and 36 formed in the casing portion 18 open into the space 30, and include non-return valves 37 and 38 respectively. The port 35 is connected to an inlet 39 for the liquid to be pumped, and port 36 is connected to a delivery outlet 40 for the liquid.

An actuator 41 for the control means 11 is mounted on the outer side of the casing portion 16 and comprises a body 42 having a stepped cylindrical bore coaxial with the diaphragm. This stepped bore comprises recesses 43 and 44 joined by a narrower passage 45 to provide shoulders 46 and 47 against which resilient conical sealing members 48 and 49 are pressed by springs 50 and 51. A rod 52 slides freely through the passage 45, the sealing members 48 and 49, the body 42 and the casing portion 16 to bear at one end against the backing plate 22. At the other end, the rod 52 bears against a spring 53 enclosed in a housing 54, which spring maintains the rod 52 constantly in contact with the plate 22. An abutment 55 is fixed on the rod 52 midway between the sealing members 48 and 49. The passage 45 is vented to atmosphere through outlets 56 and 57. The recess 43 is connected through a port 58 with the pipe 14, and the recess 44 is connected through a port 59 with the pipe 15.

In operation, commencing with the diaphragm assembly 21 in the equilibrium position shown in FIG. 1, with the space 30 filled with liquid and the shuttle valve of the control means 11 at its left hand limit of travel, compressed air is admitted from the pipe 10 through the outlet 12 of the control means 11, through the pipe 34 and the port 33 to the space 29. The pressure thus applied to the left of the diaphragm assembly 21 forces the assembly 21 to the right. As liquid cannot pass from the space 30 through the non-return valve 37, liquid is forced through the port 36, the non-return valve 38, and the delivery outlet 40. This constitutes the delivery stroke of the pump. As the diaphragm assembly 21 moves to the right the rod 52 is pushed to the right by the spring 53 until the abutment 55 engages the sealing member 48 to unseat it from the shoulder 46, thereby allowing the compressed air from the pipe 14 to escape to atmosphere through the port 58 and the outlets 56 and 57. The balanced forces acting on the shuttle valve in the control means 11 are thereby disturbed so that the force due to the compressed air in the pipe 15 is uncompensated. Consequently the shuttle valve moves to the right to place the exhaust vent 13 in communication with the outlet 12, the pipe 34, the port 33 and the space 29, and the force urging the diaphragm assembly 21 to the right is removed.

As the circumference of the annular edge portion 27 of the diaphragm 20 is greater than that of the annular edge portion 26 of the diaphragm 19, the force exerted towards the left by the compressed air in the space 28 upon the portion 27 is greater than that towards the right upon the portion 26, so that there is a resultant leftward force exerted upon the diaphragm assembly 21, causing it to move leftwards beyond the equilibrium position. As liquid cannot return to the space 30 through the non-return valve 38, further liquid is drawn into the space 30 through the inlet 39, the non-return valve 37 and the port 35, to fill the vacuum caused by the return, i.e. suction stroke, of the diaphragm assembly 21. As the diaphragm assembly 21 moves to the left, the rod 52 is pushed to the left until the abutment 55 ceases to engage the sealing member 48 so that the spring 50 returns the member 48 to rest upon the shoulder 46. The air pressure in the pipe 14 then commences to increase. On further movement to the left, the abutment 55 engages the sealing member 49 to unseat it from the shoulder 47. The air in the pipe 15 is thereby vented to atmosphere through the port 59 and the outlets 56 and 57. The shuttle valve in the control means 11 is driven to the left to initiate a second delivery stroke of the diaphragm assembly 21 in the manner above described. Operation of the pump with successive suction and delivery strokes then proceeds. The pressure at the delivery port 40 may be controlled accurately by manipulation of fluid regulator 10a.

The diaphragm 26, casing portion 18, non-return valves 37 and 38, and other parts of the pump contacting the liquid can be made from corrosion-resistant materials already available commercially.

Instead of liquids, the pump can be used without modification to convey gases. The pump may also be used as a vacuum pump by connecting the inlet 39 to a vessel to be exhausted.

A number of slave pumps may be operated from a single master pump by providing a branch to each pump from the pipes 32 and 34. These slave pumps do not require an actuator, 41, and will all be operated by the one control means 11.

The rate of delivery of liquid by the pump of FIG. 1 can be varied by variation of the amplitude of reciprocation of the diaphragm assembly 21. The modified construction of the actuator 41 illustrated in FIG. 2, permits adjustment of this amplitude, so that the pump may be used as a metering pump. The actuator comprises two parts 60 and 61 connected by an internally threaded annular hand-piece 62 which engages a left hand thread 63 formed on the part 61 and a right hand thread 64 formed on the part 60. By rotation of the hand piece 62, the parts 60 and 61, and consequently the shoulders 46 and 47, can be moved closer together or further apart. The distance which the diaphragm assembly 21 travels between the positions at which the sealing members 48 and 49 are unseated may be thereby adjusted to control the amplitude of reciprocation of the diaphragm assembly 21. The vents 56 and 57 cannot be arranged as in FIG. 1 because of the location of the hand-piece 62, and accordingly a vent 65 is formed in the part 60 to vent the space within the actuator to atmosphere.

It is evident that by removing the casing portion 18 the diaphragm assembly 21 of the pump shown in FIG. 1 is exposed to permit connection thereto of a mechanical drive, so that the pump is converted to a prime mover for general use. The application of such a prime mover to drive a modified pump is illustrated in FIG. 3, which also illustrates a modification whereby greater delivery pressure is obtained from a given pressure of the air supply.

In the pump illustrated in FIG. 1, the resultant left-hand force exerted by the air in the space 28, which force drives the diaphragm assembly 21 on the return stroke, acts in opposition to the force driving the diaphragm assembly 21 to the right on the delivery stroke, thereby reducing the maximum delivery pressure obtainable from the pump.

Referring now to FIG. 3, the control means 70, which is a commercially-available device, incorporates an additional vent 71 and an additional compressed air outlet 72 compared with the control means 11 of FIG. 1. The outlet 72 is connected by a pipe 73 with the port 31 in the space 28. The construction of the control means 70 is such that, when the shuttle valve is at its left-hand limit of travel, the outlet 72 is placed in communication with the vent 71, so that the space 28 is vented to atmosphere. At the right-hand limit of travel of the shuttle valve, the outlet 72 is placed in communication with the compressed air supply pipe 10. Consequently, when the diaphragm assembly 21 is moving to the right on the delivery stroke, the space 28 is vented, thereby removing the force opposing the movement of the diaphragm assembly 21 to correspondingly increase the pressure at which liquid is delivered. At the conclusion of the delivery stroke, the shuttle valve is moved to the right as above described, so that compressed air is supplied to the space 28 to supply the driving force for the return stroke.

The pump illustrated in FIG. 3 is intended to deliver liquid at a pressure approximately nine times the pressure of the compressed air supplied to the pump. The diaphragm assembly 21 is employed as a prime mover. No liquid is admitted to the space 30, which is at all times open to the atmosphere through the vent 74 formed in the casing portion 75 which corresponds to, but is modified in relation to, the portion 18 of FIG. 1. The casing portion 75 carries a removable end piece 76 having formed therein an outer pump chamber 77 communicating through a port 78, and a non-return valve 79, with a liquid inlet 80, and communicating through a port 81, and a non-return valve 82, with a liquid delivery outlet 83. The pump chamber 77 is extended by an open cylindrical stainless steel bellows 84 closed at the end remote from the pump chamber 77 by a plate 85 fixed to the diaphragm assembly 21.

In operation, as the diaphragm assembly 21 moves to the left the space within the bellows 84 expands, so that the liquid is drawn into the interior of the bellows 84 and into the pump chamber 77 through the inlet 80, the non-return valve 79 and the port 78. As the diaphragm assembly 21 moves to the right, the space within the bellows 84 contracts, so that liquid is forced through the port 81, the non-return valve 82 and the outlet 83. Because the compressed air acts on the diaphragm 20, whereas the liquid acts only on the plate 85 which is much smaller in area, the pressure at which the liquid is delivered is correspondingly greater than the pressure of the compressed air.

I claim:

1. A fluid operated reciprocating prime mover comprising casing; a diaphragm assembly comprising a first diaphragm sealed across the casing and, spaced therefrom, a second diaphragm of greater area also sealed across the casing, said first and second diaphragms being connected to flex in unison; a first inlet for working fluid formed in the casing to the side of the diaphragm assembly remote from the first diaphragm; a second inlet for working fluid formed in the casing between said first and second diaphragms; and means responsive to flexing of the diaphragms to control the passage of working fluid to and from said casing.

2. A prime mover according to claim 1, wherein the second inlet for working fluid is vented by said control means during movement of the diaphragm assembly in the direction from the second diaphragm towards the first diaphragm.

3. A prime mover according to claim 1, wherein the means to control the passage of working fluid is adjustable to vary the amount by which the diaphragm assembly flexes between successive strokes.

4. A pump comprising a prime mover according to claim 1, an inlet and an outlet for fluid to be pumped formed in the casing to the side of the diaphragm assembly remote from the second diaphragm; and non-return valves located in said inlet and said outlet.

References Cited

UNITED STATES PATENTS 3,291,055  12/1966  Limpert et al. _____ 103—44

FOREIGN PATENTS 208,555  8/1956  Australia.

ROBERT M. WALKER, *Primary Examiner.*